July 29, 1952 W. H. SILVER ET AL 2,604,834
QUICK DETACHABLE PLOW
Filed Dec. 4, 1944 2 SHEETS—SHEET 2

INVENTORS
WALTER H. SILVER
ROBERT E. COX
ATTORNEYS

Patented July 29, 1952

2,604,834

UNITED STATES PATENT OFFICE 2,604,834

QUICK DETACHABLE PLOW

Walter H. Silver and Robert E. Cox, Moline, Ill., assignors to Deere & Company, Moline, Ill., a corporation of Illinois Application December 4, 1944, Serial No. 566,539

6 Claims. (Cl. 97—50)

The present invention relates generally to tractor mounted implements and is more particularly concerned with tractor mounted plows.

The object and general nature of the present invention is the provision of a tractor mounted implement which is particularly designed for quick and easy connection with and disconnection from the tractor. More particularly, it is a feature of this invention to provide an integral plow adapted to be connected with and disconnected from its supporting tractor merely by manipulating two or three parts, which may be done very quickly. Specifically, it is a feature of this invention to provide a tractor mounted plow which includes a hingedly connected draft member that is adapted to be entered into a socket member carried on the tractor by backing the tractor a small distance, and then inserting a hitch pin or pivot and connecting a depth control on the tractor with the front portion of the plow beam or frame. Further, it is a feature of this invention to provide a quick detachable connection for connecting an implement with a tractor, which connection accommodates any necessary or desirable lateral swinging of the implement relative to the tractor after the connection has been established.

Additionally, it is a feature of this invention to provide a tractor mounted plow or the like in which a draft connection is made between the intermediate portion of the plow beam or frame and the tractor, with a depth control on the tractor and connected with the front end of the plow frame, whereby accurate depth control is secured but without in any material way affecting the vertical swinging of the beam relative to the tractor, thereby accommodating movement of the latter over uneven terrain without appreciably affecting the uniform depth of plowing.

These and other objects and advantages of the present invention will be apparent to those skilled in the art after a consideration of the following detailed description, taken in conjunction with the accompanying drawings in which the preferred form of the present invention has been illustrated.

In the drawings:

Figure 3 is a fragmentary detail view showing the details of the lateral tilting or leveling adjustment for each plow bottom.

Figure 1:
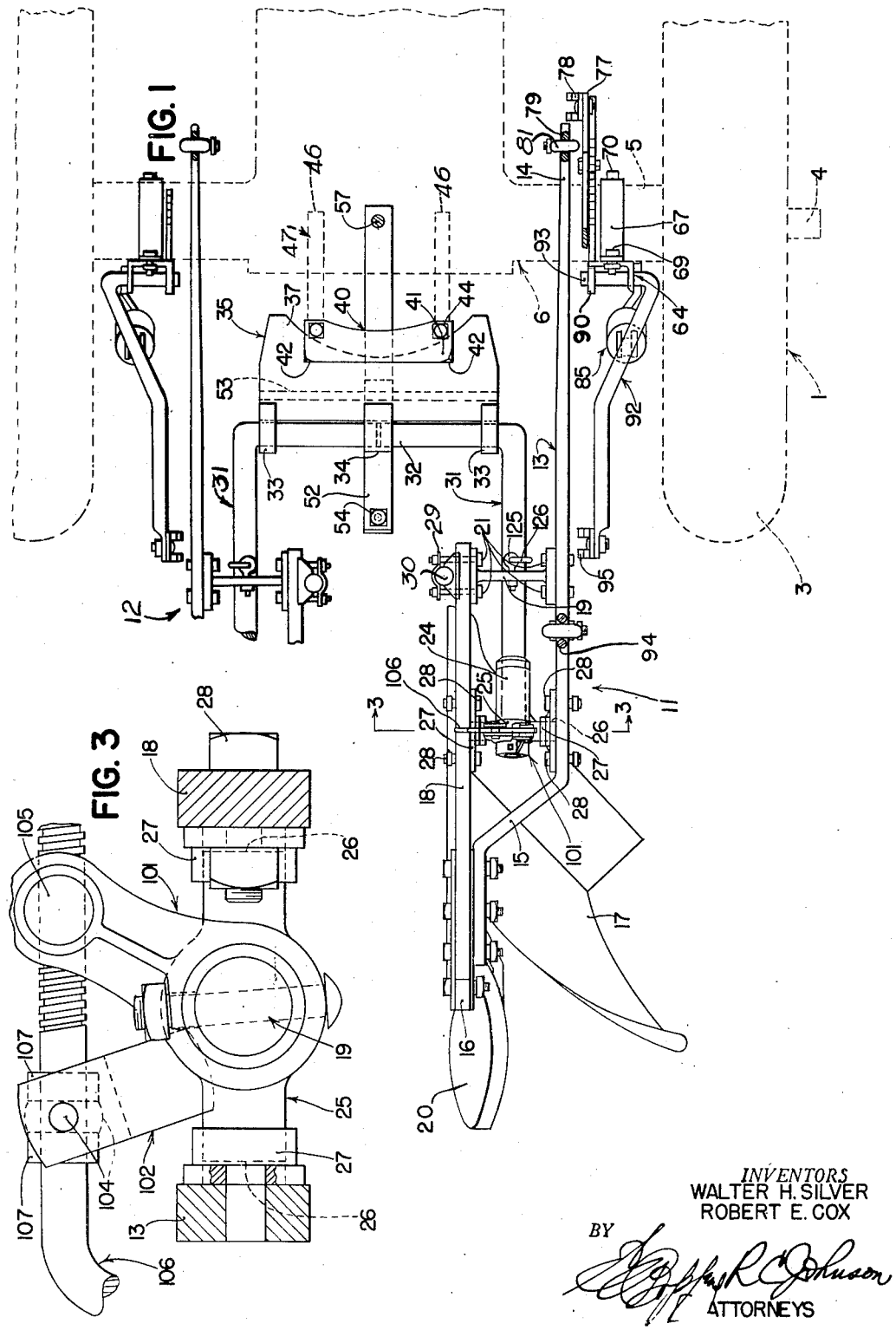
Figure 1 is a plan view of the present invention as embodied in a one-bottom two-way tractor mounted or integral plow.
Figure 2:
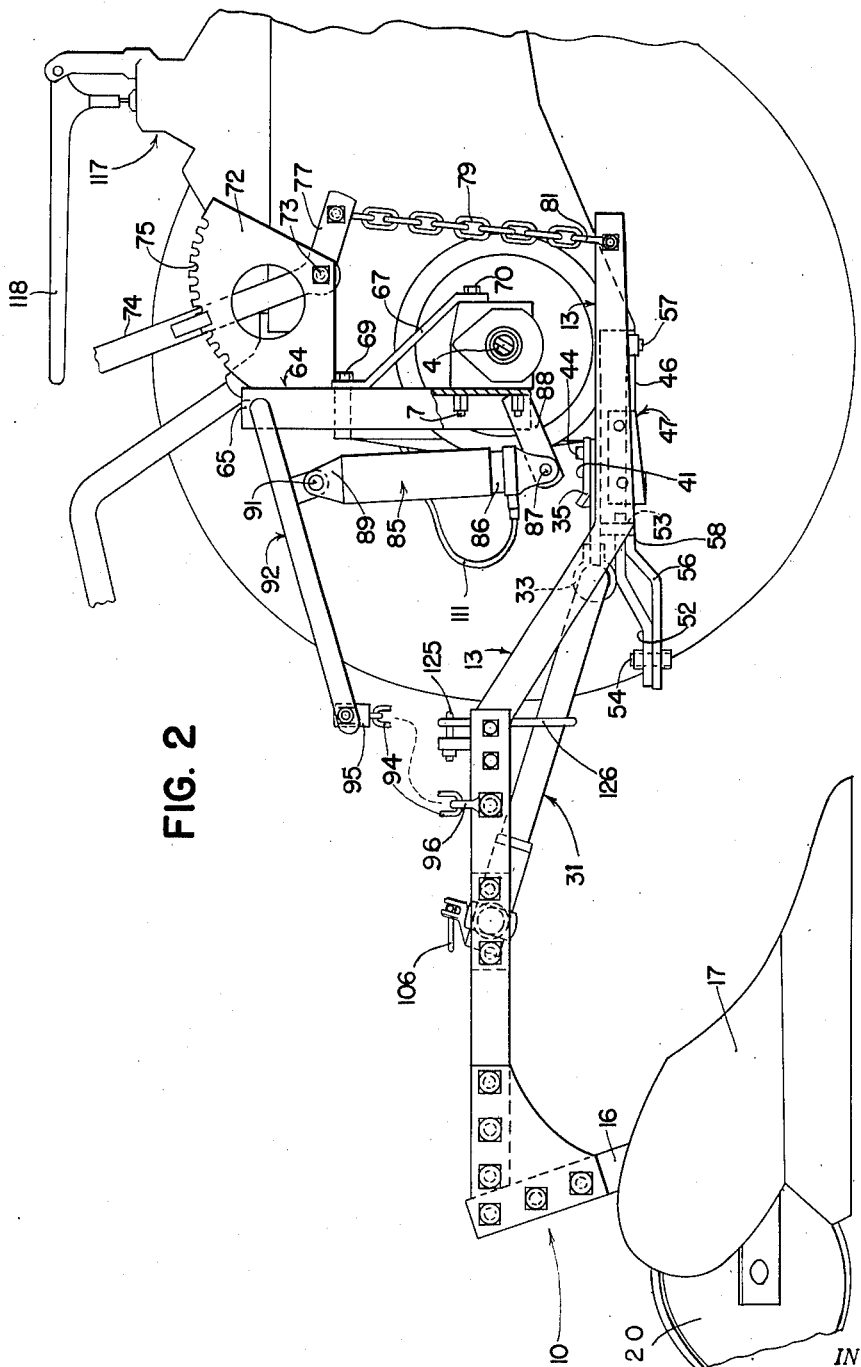
Figure 2 is a side view of the construction shown in Figure 1.

Referring now to the drawings, more particularly to Figures 1 and 2, the tractor is indicated in its entirety by the reference numeral 1 and includes a pair of closely spaced front wheels and a pair of wide spaced rear traction wheels 3 mounted on axle shafts 4 that are carried in extensions 5 forming a part of the rear axle structure 6. The latter is secured to or forms a part of the frame of the tractor. Each of the rear axle housing extensions is provided with attaching studs or the like, indicated at 7, adapted to receive various implement parts as will be referred to below.

The two-way plow forming the subject matter of the present invention is indicated in its entirety by the reference numeral 10 and includes a right-hand unit 11 and a left-hand unit 12. Generally speaking, the right and left-hand units have identical parts except that some of them are right-hand while others are left-hand, and therefore a detailed description of, for example, the right-hand unit will suffice.

The right-hand unit 11 includes a generally longitudinally extending beam 13 having a front end 14 extending forwardly underneath the tractor axle 6. At its rear end the beam 13 is bent laterally, as at 15 in Figure 1, and is joined by suitable means to a shank or standard 16 to which the plow bottom 17 is fixed in any suitable manner. A rolling landside 20 is fixed to the shank or standard 16 and cooperates with the depth adjusting and lifting means, as explained below. Forming a part of the beam 13 is a beam extension 18 which preferably is disposed in the plane of the shank or standard 16 and is secured thereto by the same bolts and brackets that fix the rear end of the beam 13 to the standard. The beam extension 18 extends forwardly and at its forward end is connected by a yoke 19 to the intermediate portion of the beam 13. The yoke 19 comprises an upwardly arched member secured, as by bolts 21, to the beam and beam extension. Rearwardly of the yoke 19, a longitudinally disposed sleeve or socket member 24 is fixed to a second yoke member 25 having trunnions 26 rotatably received in a pair of bearing brackets 27 bolted, as at 28, to the beam extension 18 and the beam 13. A colter (not shown) is mounted on the beam extension 18 adjacent the forward end thereof, preferably by the same bolts 21 that fix the laterally inner end of the yoke 19 to the beam extension 18. The last mentioned bolts are long enough, as shown in Figure 1, to extend through the clamping means 29 that fixes the colter shank 30 to the front end of the beam 18.

Rockably received in the socket or sleeve member 24 is a generally L-shaped rigid draft member 31 which, at its forward end, includes a laterally inwardly directed section 32. The laterally inwardly directed section 32 is rockably received in an outer right-hand encircling clip 33 and an intermediate encircling clip 34, both clips being secured, as by welding, to a generally horizontal flat hitch plate 35. The latter is provided with a left-hand U-shaped clip 33, and in the latter and the left half of the intermediate clip 34, the left-hand rigid draft member 31 is received. The flat hitch plate 35 extends laterally from the longitudinally extending portion of the rigid draft member at one side of the tractor to the corresponding portion of the draft member at the other side of the tractor, and has a centrally disposed arcuate section 37 which, when the plow is attached to the tractor, is received in a tractor-supported socket or recess member 40. This member comprises an upper plate 41 having its rear corners 42 bent upwardly to facilitate backing the tractor into position relative to the plate 35, the plate 41 being bolted, as at 44, to the two angles 46 making up the tractor drawbar support 47. Wear sleeves are disposed about each bolt 44 to protect the latter from wear through contact with the forward arcuate edge 37 of the plate 35. Secured to the hitch plate 35 and forming a rearwardly extending part thereof is a rearward extension 52 connected to the plate 35 by a bracket 53 or the like, and the rear hitch plate extension 52 is provided with an opening to receive a hitch bolt 54. The bolt 54 also passes through the opening in the rear end of the laterally swinging tractor drawbar 56, a part that normally is carried by the tractor drawbar support 47 and pivots laterally about a vertical axis, as defined by a pivot connection 57. A notch in the center of the bracket 53 receives the tractor drawbar, as indicated in Figure 2 at 58. Thus, while the plate member 35 is connected by only a single bolt, as at 54, to the tractor drawbar 56, the plate 35 is constrained to swing with the tractor drawbar 56 about the axis 57. This structure forms the subject matter of U. S. Patent 2,533,521, issued December 12, 1950, which is a division of this application.

At each side of the tractor a vertical angle or channel member 64 is fastened by the studs 7 to the rear axle housing extension. Each angle member 64 is reenforced by a brace 67 bolted, as at 69 and 70, to the member 64 and to the forward side of the rear axle housing. A sector 72 is secured, as by welding or the like, to each vertical angle member 64 and is apertured to receive a pivot bolt 73 by which a lever 74 is mounted thereon. The lever 74 carries the usual detent mechanism cooperating with notches 75 in the sector 72, whereby the lever 74 may be latched against movement in any one of a number of different positions. The lever 74 is extended forwardly at its lower end, as at 77, and carries a slotted clip 78 in which one of the links of a chain 79 may be engaged. The lower end of the chain 79 is connected by a clevis 81 to the forward end of the plow beam 13. By latching the lever 74 in different positions, the vertical position of the front end of the plow beam 13 may be determined. The chain 77 is a flexible element and constitutes, in effect, a one-way connection between the depth adjusting lever 74 and the front end of the beam 13, limiting the downward movement of the front end of the beam but permitting the front end of the beam to move upwardly until it engages the lower side of the associated axle extension 6 without affecting the position of the lever 74 and without being affected thereby.

Mounted on each of the angles 64 rearwardly thereof is a single acting ram or piston and cylinder unit 85. The cylinder 86 thereof is pivotally mounted, as at 87, on a bracket 88 fixed to the lower end of the angle 64, and the piston section 89 of the unit 85 is pivotally connected, as at 91, to a power lift arm 92 formed with a laterally inturned end 93 pivotally mounted in an opening formed in the rearwardly extending flange 65 of the angle 64 and a bracket 90 welded to the upper end of the angle laterally inwardly of the flange thereof. The rear end of the lift arm 92 is connected by a chain 94 to the intermediate portion of the beam 13. Preferably, the chain 94 is connected to the arm 92 by a slotted clip 95 substantially the same as the slotted clip 78 mentioned above. Each plow may therefore be raised into inoperative position by extending the ram unit 85 associated therewith, and during such lifting action the first movement of the ram unit in the extending direction raises the front end of the associated plow beam 13 upwardly until it engages the bottom of the rear axle of the tractor. Thereafter, continued extension of the ram unit then lifts the rear end of the plow beam upwardly, the latter being raised about its point of contact with the rear axle of the tractor as a fulcrum. The advantage of this arrangement is that when first starting to lift the plow out of the ground, the point is raised before the plow is actually raised, thus causing the plow to tend to run out of the ground before actually lifting the same bodily upwardly.

Each plow may be adjusted for lateral tilt, or leveling, by means acting between the plow beam and the rigid draft transmitting member 31. Referring now to Figure 3, an arm 101 is fixed to the rear end of the draft member 31 and is bent so as to be disposed substantially laterally opposite a second arm 102 fixed to the yoke 25 in which the draft transmitting member 31 is rockable generally about a longitudinal axis. Trunnion members 104 and 105 are received by the arms 101 and 102, and one of the members carries a rotatable crank screw 106 while the other member is threaded to receive the threaded end of the crank screw 106. Collars 107 or the like are fixed to the member 106 and bear against opposite sides of the trunnion member 104. Thus, by turning the crank screw 106, the position of the plow beam and plow bottom relative to the draft transmitting member 31 may be adjusted for the purpose of leveling the plow.

The hydraulic mechanism for actuating the ram units 85 is substantially like that shown in U. S. Patent 2,383,689, to Walter H. Silver, dated August 28, 1945, to which reference may be made if necessary. Briefly, such hydraulic mechanism includes two hoses 111 leading, respectively, to the rams 85 and connected at their forward or upper ends to a two-way valve unit which is controlled by a hand lever or the like. The two-way valve unit is connected to or forms a part of a controlling valve mechanism 117 carried by the tractor. The mechanism of the controlling valve mechanism 117 is not shown in detail since this structure is disclosed and claimed in United States Patent No. 2,340,474, issued February 1, 1944, to Jay D. Johnson. Briefly, such controlling valve mechanism incorporates a valve handle 118 movable to three positions, namely, an upper position in which fluid under pressure is caused to be directed outwardly from the valve unit 117, a second position in which the fluid is blocked against returning to the sump or reservoir incorporated in or associated with the unit 117, and a third position in which a valve is opened to permit oil or other fluid to flow freely back to the unit 117. In the present construction, the two-way valve unit serves as a selecting valve placing one or the other of the ram units 85 in communication with the tractor valve unit 117 to be controlled by the latter while locking fluid in or preventing flow of fluid to the other ram unit, as will be explained in more detail when describing the operation of the implement.

Each of the yokes 19 carries an eyebolt 125 to which a hook 126 is connected. The hook 126 is preferably of spring steel or the like and is constructed and arranged to be engaged underneath the associated draft member 31 for supporting the same against falling to the ground when the tractor is disconnected from the implement. When in operation, the hook 126 may be swung upwardly out of the way and hooked behind some convenient part, such as the upper end of the shank 30 of the colter.

The operation of the implement described above is substantially as follows.

Figure 2 shows the plow in operative connection with the tractor. When it is desired to disconnect the implement from the tractor, all that is necessary to do is, first, lower both plow bottoms into contact with the ground, next, engage the hooks 126 underneath their associated draft members 31, and then disconnect the bolt 54 and the two chains 79 and 94 from the slotted clips 78 and 95. The tractor may then be driven away from the implement, the latter remaining in upright position. When it is desired to reconnect the implement to the tractor, the latter is backed into a position with the rear wheels straddling the two front ends of the plow beams 13 and with the plate-receiving socket member 40 in a position to receive the plate 35. Normally, the plate 35 will be retained in a position adapted to enter the socket member by virtue of frictional contact between the loops 33, 34, 36 with the two draft members 31. When the tractor is in the proper position, it is backed or rolled into a position to cause the plate 35 to enter the socket member 40. This brings the opening in the rear end of the hitch plate extension 52 in registry with the opening in the rear end of the laterally swingable draft bar 56. It is then a simple matter to insert the hitch bolt 54. All that now remains to be done is to hook the upper ends of the chains 79 and 94 into the clips carried by the adjusting levers 74 and the lifting arms 92. The implement is now fully connected with the tractor and ready for operation. For the opening-up round, the operator will suitably adjust the operating plow for level position by turning the adjusting crank screw 106, and then after the first round has been plowed, the rear wheel of the tractor will then run in the previously opened furrow, and it is necessary for the farmer to readjust or relevel the plow by turning the crank screw 106. This leveling adjustment is then retained until some change of depth is made. The depth of operation may be changed at any time by swinging the hand lever 74 in one direction or the other, which serves to raise or lower the front end of the plow beam 13. This determines the operating depth, further adjustment being possible, as may be necessary to adapt the implement to different tractors, by engaging different links in the slotted clips 78. Normally the position of the draft transmitting link 31 is such that it extends downwardly and forwardly from its point of connection with the intermediate portion of the associated plow beam. This downward pull materially facilitates getting the plow in to the ground, but the downward reaction at the front end of the plow beam is transmitted to the tractor through the chain 79, which thus applies downward force to the tractor and increases the traction available. Either plow may be raised or lowered, as desired, by first turning the handle of the selective valve handle to select either the right-hand or left-hand bottom, and then raising or lowering that bottom by operating the main valve lever 118. When the plow is raised the link 31 swings upwardly and forwardly. This brings the plow as a whole closer to the tractor so that the rearward overhang of the plow is reduced for transport.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A tractor mounted plow comprising a generally longitudinally extending plow beam having a furrow opener at its rear end, a rigid draft transmitting member including an L-shaped bar having a laterally directed section at its forward end and a generally fore and aft extending section at its rear end, a generally fore and aft extending sleeve receiving the rear section of said bar, laterally disposed trunnion means pivotally connecting said sleeve with said plow beam for movement about a transverse axis, a part adapted to be connected to the tractor for lateral swinging relative to the tractor, means carried by said part for hingedly receiving the laterally directed section of said bar, whereby the latter may swing generally vertically about a transverse axis relative to said bar, thereby providing for generally vertical swinging of said bar relative to the tractor, and means connected between said plow beam and the rear portion of said bar for shifting said plow beam relative to said bar about the longitudinal axis defined by said fore and aft extending sleeve.

2. A tractor mounted plow comprising a generally longitudinally extending plow beam having a furrow opener at its rear end, a rigid draft transmitting member having a laterally directed section at its forward end and a rear section extending generally in a fore and aft direction, a generally fore and aft extending sleeve receiving the rear section of said member, laterally disposed trunnion means pivotally connecting said sleeve with said plow beam, a part adapted to be connected at its forward end to the tractor for lateral swinging relative to the tractor for movement relative thereto about a generally vertical axis, means carried by the rear portion of said laterally swingable part for rockably receiving said laterally directed section of said draft transmitting member, whereby the latter may swing generally vertically about a transverse axis relative to said member, thereby providing for generally vertical swinging of said draft transmitting member relative to the tractor, and means for shifting said plow beam relative to said member about the axis defined by said fore and aft extending sleeve, including an arm on said sleeve, an arm fixed to said member, and adjusting mechanism acting between said arms.

3. A tractor mounted plow comprising a generally longitudinally extending plow beam having a furrow opener at its rear end and a pair of laterally spaced apart sections forward of the rear end of the beam, a rigid draft transmitting member having a laterally directed section at its forward end and a rear section disposed generally between said beam sections and extending generally in a fore and aft direction, a generally fore and aft extending sleeve also disposed between said beam sections and rockably receiving the rear section of said member, a yoke fixed to said sleeve and pivotally connected to said beam sections for movement relative thereto about a transverse axis, a part adapted to be connected at its forward end to the tractor for lateral swinging relative to the tractor for movement relative thereto about a generally vertical axis, means carried by the rear portion of said laterally swingable part for rockably receiving said laterally directed section of said draft transmitting member, whereby the latter may swing generally vertically about a transverse axis relative to said member, thereby providing for generally vertical swinging of said draft transmitting member relative to the tractor, adjusting mechanism acting between said yoke and the rear end of said rigid draft transmitting member for rocking the plow beam relative to said member, and means for shifting said plow beam relative to said tractor in a generally vertical direction, the shifting of said plow beam being accommodated by generally vertical swinging of said draft member relative to the tractor and said plow beam.

4. The invention set forth in claim 3, further characterized by latching means connectible between said plow beam and said draft member for holding the latter in position when detached from the tractor.

5. A tractor mounted plow comprising a generally longitudinally extending plow beam having a furrow opener at its rear end and a pair of laterally spaced apart sections, a rigid draft transmitting member including a generally fore and aft extending section, a yoke disposed transversely between and pivoted to said plow beam sections for movement relative thereto about a transverse axis, a fore and aft extending sleeve rockably receiving said fore and aft extending section and connected to said yoke to rock therewith about said transverse axis, and means connected between the rear end of said member and said yoke for shifting said plow beam, yoke and sleeve relative to the fore and aft extending section of said draft member.

6. A tractor mounted plow comprising a generally longitudinally extending plow beam having a furrow opener at its rear end and a pair of laterally spaced apart sections, a rigid draft transmitting member including a generally fore and aft extending section, a yoke disposed transversely between and pivoted to said plow beam sections for movement relative thereto about a transverse axis, a fore and aft extending sleeve rockably receiving said fore and aft extending section and connected to said yoke, and means acting between said yoke and said draft transmitting member for shifting said plow beam, yoke and sleeve relative to the fore and aft extending section of said draft member, said means comprising an arm on said yoke, an arm fixed to said draft member, and adjusting means acting between said arms.

WALTER H. SILVER.
ROBERT E. COX.

REFERENCES CITED

The following references are of record in the file of this patent:

UNITED STATES PATENTS

| Number | Name | Date |
|---|---|---|
| 132,772 | Owen | Nov. 5, 1872 |
| 209,688 | Hunter | Nov. 5, 1878 |
| 1,420,108 | Kinney | June 20, 1922 |
| 1,501,651 | Ferguson | July 15, 1924 |
| 1,648,366 | Shields | Nov. 8, 1927 |
| 1,688,615 | Daniel | Oct. 23, 1928 |
| 1,765,788 | Daniel | June 24, 1930 |
| 1,807,731 | Ehricke | June 2, 1931 |
| 1,831,997 | Brown | Nov. 17, 1931 |
| 1,902,846 | Graham | Mar. 28, 1933 |
| 2,086,350 | Brown | July 6, 1937 |
| 2,222,115 | Mott | Nov. 19, 1940 |
| 2,339,225 | Strandlund | Jan. 11, 1944 |
| 2,339,830 | Zink et al. | Jan. 25, 1944 |
| 2,364,367 | Janke | Dec. 5, 1944 |
| 2,403,360 | Graham | July 2, 1946 |